United States Patent
Coll et al.

(10) Patent No.: US 10,860,697 B2
(45) Date of Patent: Dec. 8, 2020

(54) PRIVATE CONTENT IN SEARCH ENGINE RESULTS

(71) Applicant: Microsoft Technology Licensing, LLC, Redmond, WA (US)

(72) Inventors: Alexander Coll, Seattle, WA (US); Yi Li, Bellevue, WA (US); Gregory Mark Hewett, Lubbock, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

(21) Appl. No.: 15/376,808

(22) Filed: Dec. 13, 2016

(65) Prior Publication Data

US 2018/0165310 A1 Jun. 14, 2018

(51) Int. Cl.
  *G06F 21/31* (2013.01)
  *G06F 21/62* (2013.01)
  *G06F 16/951* (2019.01)

(52) U.S. Cl.
  CPC ............ *G06F 21/31* (2013.01); *G06F 16/951* (2019.01); *G06F 21/6227* (2013.01)

(58) Field of Classification Search
  CPC ..... G06F 21/31; G06F 21/6227; G06F 16/951
  See application file for complete search history.

(56) References Cited

U.S. PATENT DOCUMENTS

| | | | |
|---|---|---|---|
| 6,028,601 A * | 2/2000 | Machiraju | G06F 17/30675 707/999.004 |
| 7,600,263 B1 * | 10/2009 | Nguyen | G06F 21/6227 713/168 |
| 7,725,453 B1 | 5/2010 | Chen et al. | |
| 7,797,295 B2 | 9/2010 | Bell et al. | |
| 8,290,941 B2 | 10/2012 | Alexander | |
| 8,751,466 B1 | 6/2014 | Tsay | |
| 9,135,303 B2 | 9/2015 | Stekkelpak | |
| 9,189,552 B2 | 11/2015 | Riley et al. | |

(Continued)

OTHER PUBLICATIONS

What is the Difference Between Authentication and Authorization, Vivek Gite | Mar. 13, 2009, https://www.cyberciti.biz/faq/authentication-vs-authorization/ (Year: 2009)*

(Continued)

*Primary Examiner* — Hau H Hoang
(74) *Attorney, Agent, or Firm* — Medley, Behrens & Lewis, LLC

(57) ABSTRACT

Representative embodiments allow private user created content to be submitted for a query so that a user can search from outside a corporate firewall and retrieve both private user created content and web content. The private user created content and web content are presented in the same user interface. Embodiments allow users to create content and keep a private content index that allows such content to be retrieved with an appropriate query along with public web content. Embodiments allow feedback on the user content to be submitted. Feedback can be used for quality control and other purposes. Some user created content has an expiration date after which the content will not be retrieved. Some embodiments place the private index within a compliance boundary and results are returned from within the compliance boundary directly to a browser so the search system has no access to the private data.

19 Claims, 8 Drawing Sheets

(56) References Cited

U.S. PATENT DOCUMENTS

| | | |
|---|---|---|
| 9,197,718 B2 | 11/2015 | Kiang et al. |
| 9,262,525 B2 | 2/2016 | Shafer et al. |
| 2002/0082857 A1* | 6/2002 | Skordin .................. G06F 40/174 705/1.1 |
| 2007/0100829 A1 | 5/2007 | Allen et al. |
| 2009/0164929 A1 | 6/2009 | Chen et al. |
| 2009/0271871 A1* | 10/2009 | Nied .................... G06F 16/1827 726/28 |
| 2010/0011282 A1* | 1/2010 | Dollard .................. G06F 17/241 715/233 |
| 2012/0233209 A1* | 9/2012 | Cheng ................ G06F 17/30312 707/770 |
| 2012/0331108 A1* | 12/2012 | Ferdowsi ................ H04L 67/06 709/219 |
| 2013/0246384 A1* | 9/2013 | Victor .................. H04L 67/1097 707/706 |
| 2014/0090037 A1* | 3/2014 | Singh .................. H04L 63/0815 726/7 |
| 2014/0181969 A1* | 6/2014 | Mousty ............... H04L 63/1408 726/23 |
| 2014/0215568 A1* | 7/2014 | Kirigin ................... G06F 21/00 726/4 |

OTHER PUBLICATIONS

French, et al., "Personalized Information Environments", In Publication of D-Lib Magazine, vol. 5, No. 6, Jun. 1999, 16 pages.

"Take control of your search", Published on: Apr. 20, 2016 Available at: https://swiftype.com/site-search.

Huang, Ying, "Google Custom Search Blog", Published on: Dec. 10, 2013 Available at: http://googlecustomsearch.blogspot.in/.

Graham, Krista, "TechMatters: Search and Search-ability: Google Custom Search & Library Instruction", In Journal of LOEX Quarterly, vol. 34, Issue 1, Apr. 2007, pp. 6-7.

U.S. Appl. No. 15/057,972, Coll, et al., "Blending Enterprise content and Web results", filed Mar. 1, 2016.

* cited by examiner

PRIVATE CONTENT IN SEARCH ENGINE RESULTS

FIELD

This application relates generally to search systems. More specifically, embodiments disclosed herein allow users to create private content that is searched from outside the firewall of a company and presented along with search results from the internet.

BACKGROUND

Search engines have made it easy to access vast amounts of public (i.e., internet) data. Such search engines have evolved to be relatively easy to use and are reasonable good at returning relevant information to a user via relatively simple queries. Many search engines contain complicated logic and structures to locate and index the information available on the internet. The power of such search engines has been difficult to apply in the enterprise (i.e., company, corporate, etc.) context. The cost of procuring, maintaining and utilizing such systems within the boundary of the corporate firewall is often prohibitive, particularly for smaller enterprises. Furthermore, systems that have been put in place in the enterprise lack the ease of use and the power of such search systems.

Users in enterprises (corporations, companies, etc.) create a large amount of data that is either inaccessible or difficult to access. Many enterprises have shared servers, shared content repositories, and numerous other similar data repositories that contain data that is largely inaccessible unless a user knows the data exists and knows where to find the data. File sharing, data sharing, and other such systems have not been successful in making user created data both discoverable and available.

It is within this context that the present disclosure arises.

DETAILED DESCRIPTION

Figure 1:
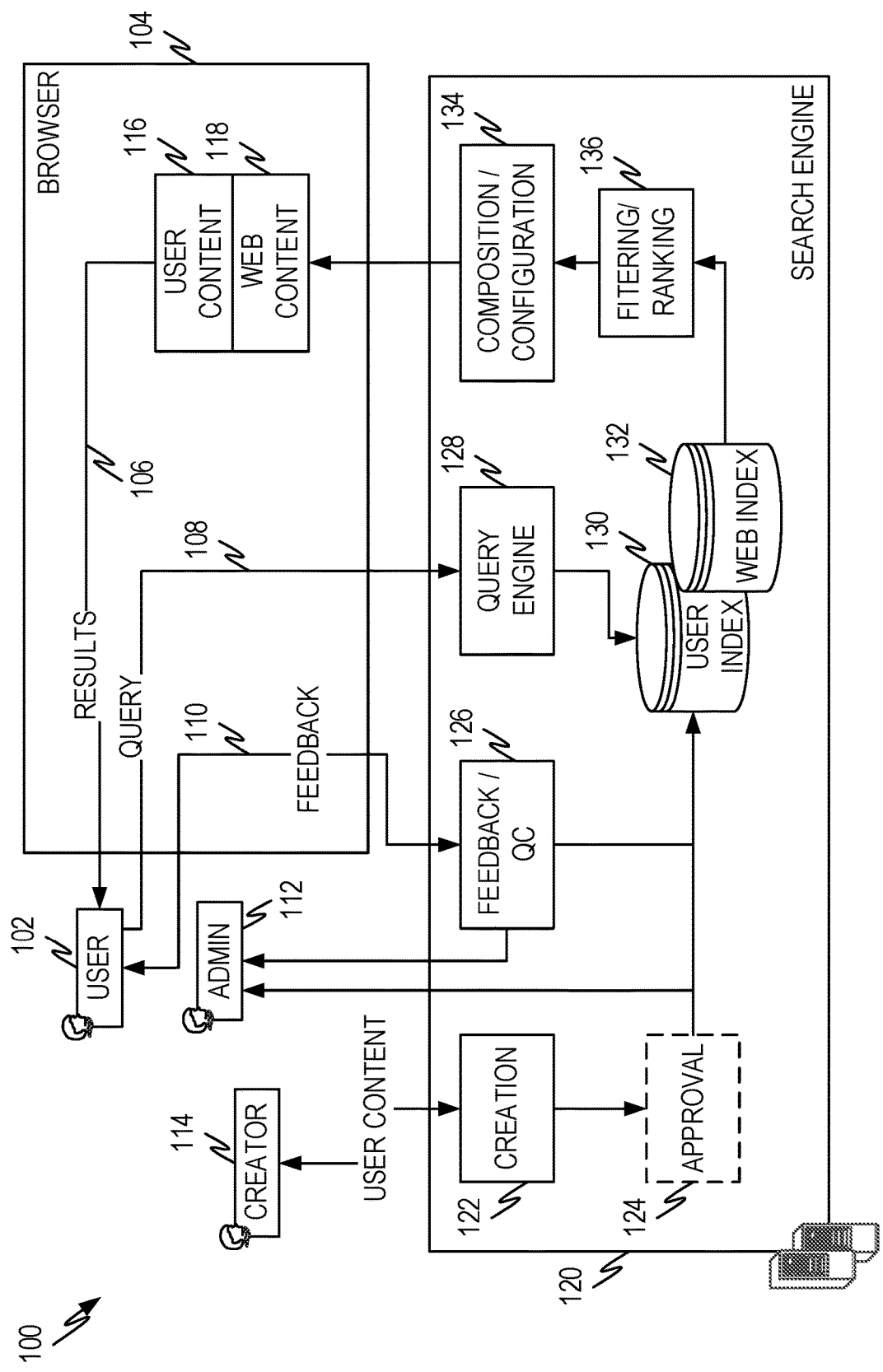
FIG. 1 illustrates an example architecture 100 of a system that allows users to create content for a query, retrieve user generated content and allow a user to create feedback on user generated content.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Much of the user content created in enterprises is inaccessible by user search. The disclosure below comprises three main areas. In a first area, users can create user generated content and the system will associate the user generated content with a search query, key word(s), key phrase(s), etc. (referred to in the disclosure as a search query). A record can be placed in a user index for which queries can be executed and search results obtained. In a second area, a search query is received from an authenticated user. The authentication process identifies which user index(es) are accessible to the user and can be searched for user content. User content from the index can be returned along with public content from the web and presented to the user in response to a search query. In a third area, users can submit feedback for the user generated content. The feedback can be presented along with the user content. Due to authentication, these functions can be performed from outside the corporate firewall.

As part of the user content generation scenario, the system can authenticate the user to verify the user's identity and confirm the permissions associated with the user. If the user is authorized to create user content, the user interface presented to the user can include a link or other control that can be activated by the user to initiate the content creation process. If the user is not authorized to create user content, the link, control, etc. can be disabled so the user is unable to initiate the content creation process. When the control is disabled, the user can hover, right click, or interact with the control in some other fashion and the system can present information informing the user why the content creation control is disabled.

Once the content creation process is initiated, the user submits a query and the system allows the user to create content associated with the query. Thus, the system can present a content editor, receive pre-created content from the user, or otherwise receive the user created content. In some embodiments, once content is submitted by the user, the system expands the query received by the user by identifying alternative queries that can be used to retrieve the user generated content. This can happen behind the scenes (i.e., unknown by the user). In some instances, the alternative queries can be presented to the user and the user can select one or more of the alternative queries to be associated with the user content. A record is created in the user index and a link to retrieve the user content is returned to the user. In some embodiments, this link will bypass any filters or other suppression technology to directly retrieve the user content. User content can have an assigned expiration date after which the content cannot be retrieved by search query.

To retrieve user content, a user submits a search query to the search engine. If the user is not authenticated when submitting the search query, the user content is not retrieved, and only web results are returned. If the user has been authenticated, the credentials of the user can be used to identify a user index that the user can access. When the user submits a search query, search results from both a web index of public content and a user index of private (i.e., user generated) content is returned to the user.

In some embodiments, systems behind a compliance boundary are used to ensure privacy of user generated content. The user index is placed behind the compliance boundary and is identified with a tenant identifier (ID). A user authenticates to the search system as described above and submits a search query. The search system identifies the tenant ID using the credentials the user authenticates with. The user credentials are then used to federate to the user index and the search system passes the query to the user index. Search results are retrieved from the user index based on the search query and a proper subset of the search results are passed directly back to the browser. The search system searches the web index based on the search query and passes a proper subset of the search results back to the browser. The browser assembles the public (web) search results and private (user) search results and presents them to the user. Thus, the private user generated content is never available to the search system and privacy and security are preserved.

Feedback can also be submitted by users to user generated content. A user authenticates to the system and retrieves user generated content via search as previously described. If the user is authorized to submit feedback, the user activates a control to submit feedback on an item of user generated content. Embodiments of the disclosure can handle submitted feedback in several ways. In some embodiments, the feedback is parsed and, if the feedback meets certain criteria, the feedback is sent to a system administrator. Thus, an enterprise can manage inappropriate feedback, feedback that could open the enterprise up to liability, or other categories of feedback that the enterprise determines should be handled on an administrator level. In some embodiments, feedback is associated with the user generated content and presented to users that retrieve the associated user generated content via a search query. In some embodiments, the feedback is sent to the user that generated the content, either as it comes in or in a digest format. In some embodiments, the user that generated the content can see not only the feedback, but additional information such as a graph on number of views, the name of individuals who retrieved and further interacted with the content (i.e., clicked the user generated content), and/or so forth. In some embodiments, combinations thereof are utilized.

Description

FIG. 1 illustrates an example architecture 100 of a system that allows users to create content for a query, retrieve user generated content and allow a user to create feedback on user generated content. To create user generated content and submit the content for a query (i.e., submit the content so that the query retrieves the content), a content creator 114 invokes a content creation process 122. The content creation process 122 is discussed in greater detail in conjunction with FIG. 3, below.

To invoke the content creation process, the content creator 114 presents user credentials to the system and authenticates to the system. The search engine backend 120 can utilize the credentials not only to identify the content creator 114, but also to identify what the content creator 114 is authorized to do. In some embodiments, users (i.e., content creators) are limited in the number of "cards" (i.e., user generated content items) they can create. In embodiments that implement limits on the number of cards that a user can create, the goal is to prevent the user index from becoming a dumping ground for old and stale data. When a user with a limited number of cards reaches their card limit, the user can choose to remove previously created content to make room for new information.

In the context of this disclosure, items of user generated content will be referred to as cards. Cards can include any type of user created content that an enterprise desires to allow, including files, documents, presentations, and other content created by a user using programs or applications. In addition, cards can include data that is created by a user in an editor presented to the user for that purpose as explained in conjunction with FIGS. 3-4 below.

In other embodiments, some users are limited in the number of cards they can create while other users are unlimited in the number of cards they can create. Thus, certain users such as those that work in an enterprise library may be allowed to create an unlimited number of cards. In other embodiments, limits, including a no limit option, may be set based on any criteria the enterprise determines. In still other embodiments, limits could be adjusted dynamically, for example based on ratings, content type, and so forth. In still further embodiments, the number of cards may have different limits depending on various factors such as the type of card created. For users that have a card limit, the search engine 120 can keep track of the number of cards a user has created and disable a user control or otherwise prevent the user from creating additional content that goes beyond the user's card limit.

When a user is authorized to create content, the user will be allowed to create, download, or otherwise indicate the user content for the card. The search engine 120 returns a URL to the card to the user once the card is created. The URL can be used to directly retrieve the card independent of any search engine logic that is applied to search results as explained in greater detail below. The URL can be given to anyone that the content creator 114 desires to allow them to retrieve the card directly.

In some embodiments, approval is needed before a card can be made available for retrieval by a search query. In other embodiments, no approval is needed. Is still other embodiments, the cards are posted to the database and feedback is used to identify and eliminate cards that should not be in the system. In other embodiments, any combination of these are used.

Any approval process 124 is illustrated in FIG. 1 and, as shown in FIG. 1, may feed information to an administrator 112 to allow the administrator to give approval. Additionally, or alternatively, the approval process 124 may rely on automated processes, machine learning processes, keyword/key phrase matching, and other such processes to automatically approve some or all the submitted cards. For example, the approval process 124 can filter out (i.e., deny approval) cards that fit certain criteria (i.e., violate enterprise policy, or other criteria). In another example, the approval process 124 filters out cards that it can determine should be denied approval, approves those that it can determine should be approved, and passes on to an administrator 112 those that it cannot determine whether to approve or deny. In yet another example, all cards are passed to an administrator 112 for approval.

In systems where approval is given before a card is made available to be retrieved by a search query, when a search query would retrieve a card with approval still pending, the search results can be returned without the card. In other embodiments, the card can be returned with an "approval pending" label. In still other embodiments, the card is not returned, but information related to the card is placed in the search results so that the user running the query can determine that a card that has not received approval exists, but won't be shown until approval is given. Such information can include, for example, the content creator and the user attempting to retrieve the data can contact the content creator to obtain the URL that will allow the card to be retrieved directly.

Information that enables finding and retrieving the cards is placed in the user index 130. As explained below, such information can comprise one or more of:
- Card content.
- A link to where the card content can be located and retrieved.
- A summary of the card content.
- Card creation date.
- Card expiration date.
- User that created the card.
- Other metadata such as feedback, rating, and so forth.

One distinction in the content creation process just described is that the search engine is not crawling the corporate network looking for and indexing the content in the corporate network. Rather, as discussed above and in greater detail in FIGS. 3-4 below, the user submits the content and identifies at least an initial query that should be associated with the user content. Some embodiments may allow a user to specify multiple queries or query patterns to associate with a card. Queries could be developed in other ways as well. As users submit queries to retrieve other cards and user documents, the system can mine that data to develop suggested queries for the existing card based on similarity of content and/or other factors. Users that retrieve a card can also submit feedback on the query/queries that that are associated with the card in order to provide suggestions for changes to the associated queires. In other words, the search engine 120 is in some sense a passive partner and relies on users to create and submit the content to the search engine and tell the search engine when the content should be retrieved.

To retrieve search results, a user 102 authenticates with the search engine 120 using user credentials. The credentials allow the search engine 120 to identify which user index 130 (if any) the user can search. The user submits a query 108 to the search engine 120 and the query is eventually passed to a component such as a query engine 128. The query engine 128 understands users' queries and sends the queries to the right index. Thus, the query engine could send received queries to the user index, to the web index, or both, depending on whether the user query is directed to user content, web content, or both. The search engine 120/query engine 128 can operate as in existing search engines as far as the web content is concerned.

If the user is authorized to search one or more user indexes 130, the query engine 128 can also search the user index 130 for user generated content to be retrieved in accordance with the query. As discussed above, cards have associated queries. Thus, entries in the user index can comprise keywords, key phrases, and/or other metadata that allows the query engine 128 to retrieve the appropriate cards when the appropriate query is used. As explained in greater detail below, the search engine 120 can also expand on the user's query when content is submitted and thus the user index 130 may also comprise additional information that allows other queries to retrieve a card.

The search results from the web index 132 and/or the user index 130 are passed to ranking process 136, where the search results are filtered, ranked and a proper subset of the search results is selected to be returned to the user 102. Any filtering and/or ranking process can be used to help select the most relevant results to be returned to the user. As explained below, the search results for the web and the private user search results can be presented in different areas of the user interface or otherwise marked so that the user can clearly identify which results are public (i.e., from the web index) and which are private (i.e., from the user index). To facilitate this, the search results from the web index and the search results from the user index can be ranked separately, so that the output of the ranking process 136 are two ranked lists of search results that will be presented to the user. Furthermore, the search ranking process 136 need not use the same criteria to rank public and private search results. Alternatively, a single ranked list can be created.

The search result ranking 136 will use one or more criterion to rank the search results. Ranking a list of items typically involves selecting the criteria/criterion to be used and then ordering the list per the selected criteria/criterion. Where multiple criteria are used, a single aggregate ranking score can be calculated or the results can be first ranked per one criterion and then by another criterion. Many search result ranking processes exist and are known and the details need not be repeated here. In some embodiments, the results from the web index and from the user index may impact the selection and/or ranking of results from the other index. For example, if the results from the web index have high scores while the results from the user index have low scores, the ranking algorithm may suppress the results from the user index in favor of the web results. Similarly, if the results from the user index have a high score while the results from the web index have a low score, then the web results might be suppressed. As another example, if the results from the user index have a high score, the results from the web index may be re-ranked using the user index results as a guide (i.e., selecting web index results that are aligned with the user index results). In some implementations, the query can be sent to one index first and, once the results are returned, the query can be altered before sending it to the other index to get consistent results between the two indexes. All the ranking processes have a similar goal to return to the user the search results that are predicted to be the most useful to the user.

The ranked results are passed to the composition/configuration process 134. The composition/configuration process 134 takes the ranked search list(s) and places it in a format to be returned to the user. Thus, composition/configuration process 134 can create an HTML web page containing the ranked search results and return the HTML document to the browser 104. The HTML page can be created by known methods, and can utilize templates, style sheets and so forth.

The user content 116 and web content 118 are returned to the browser 104 and the results 106 are presented to the user 102. One feature of the system as illustrated in FIG. 1 is that the user need not be behind the enterprise firewall to retrieve user data. Thus, a user can access and retrieve user data with the same user interface, and with the same ease as retrieving web search results.

Users 102 can also provide feedback to a card. The feedback process is discussed in greater detail in conjunction with FIG. 5 below. User feedback is part of an overall quality control mechanism. One of the problems with user generated content in the enterprise context is that it is difficult to police and remove irrelevant, outdated, or otherwise unimportant data. File sharing services, shared server storage, content and workflow sharing services and so forth allow users to store user created content. However, retaining relevant information while removing irrelevant information is a difficult process and may systems include old, stale, or otherwise unimportant information that should have long ago been removed. The feedback mechanism disclosed herein is part of a process that allows users and administrators to identify and remove irrelevant information.

In addition to feedback, the system may implement automated mechanisms to clean up and remove invalid or stale content. As described herein, content can have an expiration date after which the system removes the card from the system unless the expiration date is extended. Additionally, the system can periodically check the links to identify whether they are still valid and remove those that contain invalid content.

A user 102 authenticates to the system to allow the system to identify what user index 130 the user is authorized to access and to identify whether the user has the authority to provide feedback 110 and what type of feedback 110 the user can provide. In many embodiments, the ability to provide feedback 110 is not restricted and users can provide feedback 110 on any cards the user can retrieve. In some embodiments conditions to provide feedback 110 may be imposed such as only allowing feedback 110 after a card has been approved, allowing only certain kinds of feedback 110 or feedback 110 that fits a form, etc.

Feedback 110 can come in the form of text, such as commentary on the card, a rating such as like, dislike or other rating or in any other form and combinations thereof. Similarly, the system can track user interactions with the user content, such as whether the user reads the card, whether the user clicks on a search link to retrieve the card, how long the user spends with the card, whether the user forwards or recommends the card to others and so forth. Thus, feedback 110 can be explicit (such as a comment and/or rating) or can be implicit (such as through tracking user interactions/actions).

If authorized, a user can initiate the feedback process 126 through manipulation of a user interface control (i.e., clicking, touching, tapping, etc.) or in some other way. The search engine 120 can receive the user feedback 110 and then take appropriate action. For example, the feedback process 126 can parse or otherwise analyze (i.e., through machine learning algorithms, matching keywords/key phrases, etc.) the feedback to identify whether it meets one or more criterion to be forwarded to an administrator 112 for handling. For example, if someone points out inappropriate user content, the feedback process 126 may route that feedback to an administrator 112 for further investigation and/or handling.

The feedback process 126 can also operate in the background collecting user interactions and making inferences and/or collecting statistics based on user interaction. For example, if a user forward the card to several other people, the system can infer that the user found the content relevant and increase the relevance of the user content (i.e., as it relates to the user's query that retrieved the card). Alternatively, if no user has ever clicked on a link to retrieve the card, the system can infer that the card is irrelevant (i.e., as it relates to the user's query), that the card is low quality, or other such inferences. Such inferences are made by a machine learning model.

The inferences/feedback can also be used to promote/demote/block cards in the ranking process or be used to adjust which queries retrieve which cards. Thus, when the inferences indicate a card is relevant, then the card can be promoted during the ranking process. Similarly, cards that are rated as irrelevant can be demoted or blocked during the ranking process. A card may be good for one query and not for another. Thus, when the "not good" card is retrieved by a query, the ranking process can suppress or demote that card and/or promote the "good" card. In addition, the feedback and inferences can be used to promote/demote/block users (i.e., the card's creator) during the ranking process.

Collected feedback can be stored and displayed in conjunction with the card when it is displayed as part of the search results or when the card is retrieved via the URL for the card. For example, when a user pulls up a card as part of search results, the user may see such information as ratings, comments, and so forth. When a user retrieves the card, the user may see the same thing that other users see. Additionally or alternatively, the user may see statistics on how often the card has been returned as part of search results, how many users have clicked to retrieve the card, who has retrieved the card, and so forth.

Figure 2:
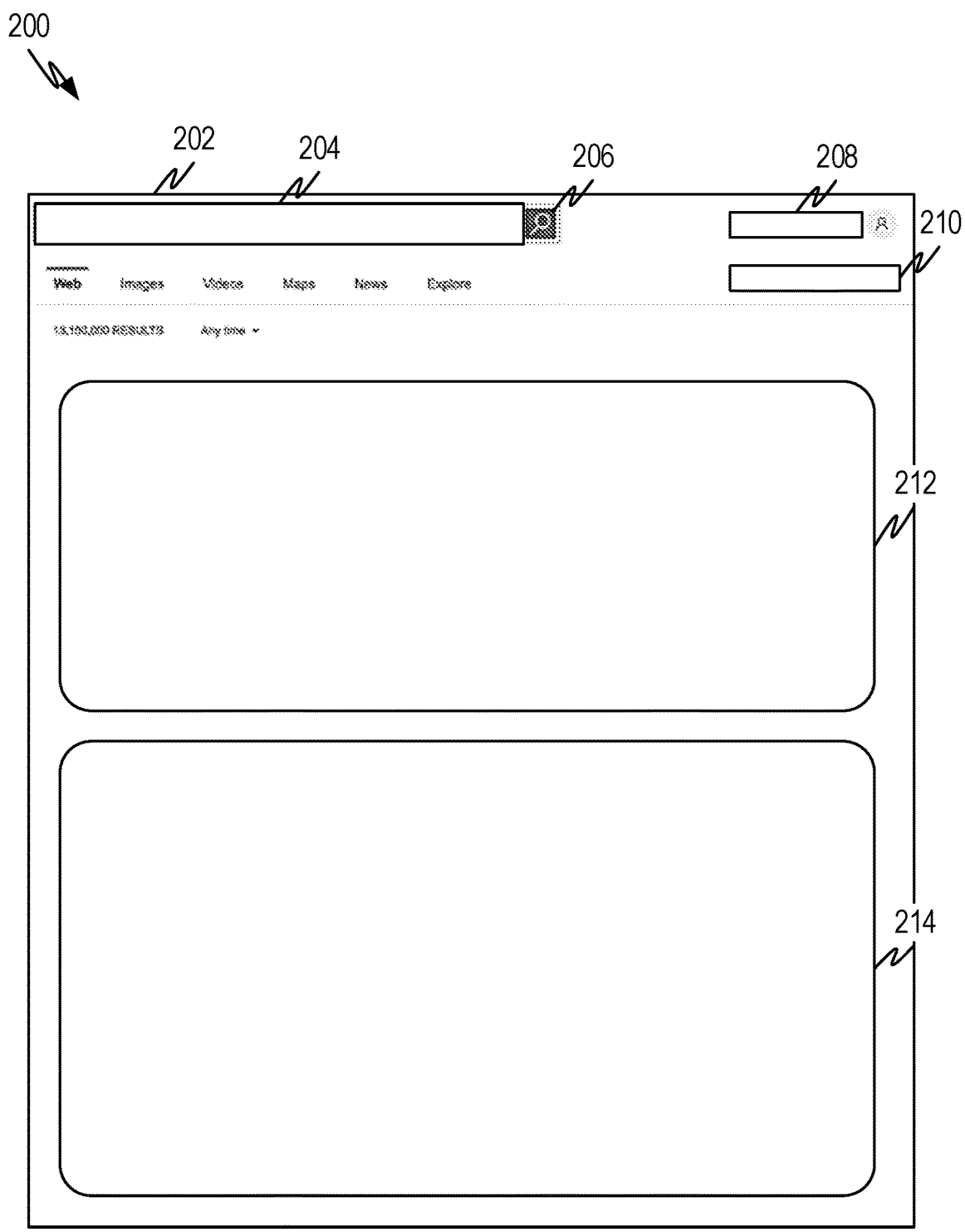
FIG. 2 illustrates an example user interface presenting user created content and web content.

FIG. 2 illustrates an example user interface 200 presenting user created content 212 and web content 214 in response to a submitted search query. This UI represents, for example, how results 106 may be presented in some embodiments. The UI comprises a window 202 that holds the UI areas, controls and so forth. The UI also comprises an area 208 where a user can click or otherwise manipulate a control to authenticate to the search engine. The control will allow a user to authenticate using one or more authentication mechanisms such as username/password, multi-factor authentication, authentication by biometrics and so forth. As noted above, the authentication allows the search engine to identify which user index the user is authorized to access, if any. Furthermore, the user credentials can be utilized to federate to a user index that is behind a compliance boundary as discussed below.

The user interface also has an area 204 to enter a search query to retrieve web and/or user search results as described herein. The user types or otherwise enters a search query into an area 204 and manipulates a control such as 206, presses the enter key or performs a gesture to submit the search query to the search engine.

The user interface also has two areas 212, 214 for presentation of private (user) search results and public (web) search results, respectively. In this user interface, the user results are presented first while the web results are presented afterward. The areas 212, 214 can be sized such that they scroll separately (i.e., the user can scroll the search results in area 212 separately from the search results in area 214).

The user interface also provides an area 210 that contains a control that a user can manipulate to create user content. Creation of content is explained in greater detail below.

Figure 3:
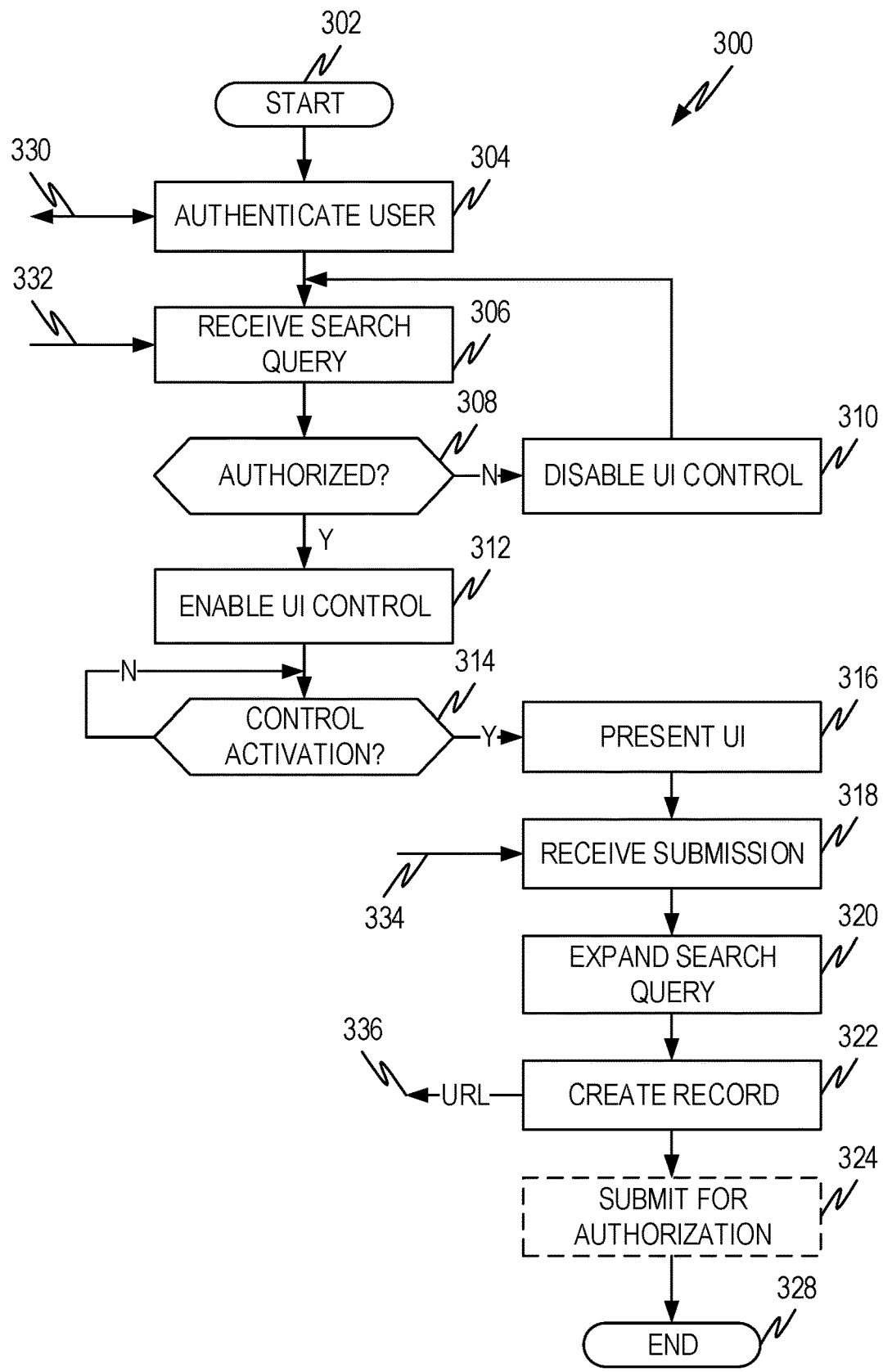
FIG. 3 illustrates an example flow diagram for creating user content for a query.

FIG. 3 illustrates an example flow diagram 300 for creating user content for a query. The process starts at 302 and proceeds to operation 304, where authentication credentials received from the user as indicated by arrow 330 if the user has not already authenticated with the search engine. Authentication can be performed in any desired manner such as username/password, multi-factor authentication, biometric authentication and so forth. Once the user is authenticated, the system can ascertain what user index, if any, the user has the right to submit content to and whether the user meets the criteria for submitting content as discussed below.

User created content (card) is associated with one or more user queries used to retrieve the content. Thus, when a user creates a card, the user also indicates a query, keyword(s), key phrase, and/or so forth (collectively referred to herein as a search query) someone would use to retrieve the card. This can be done in several ways. In one embodiment, illustrated here, the system receives a search query as indicated by operation 306 and arrow 332. Alternatively, the search query may be received at some other point in the process. Once a search query is submitted, the system can return search results (not illustrated).

In operation 308 the system determines if a user is authorized to submit content tied to the received query. As previously explained, in some embodiments users can be limited in the number of cards they can create. Thus, a user may not be authorized to create content for the received query if the user has reached their card limit. The system may also prevent users from submitting cards to be associated with queries that are too broad, not appropriate, or otherwise prohibited by the enterprise. In a system such as that illustrated in FIG. 1 the system can keep track of enterprise policies that indicate search queries are prohibited by an enterprise. Additionally, or alternatively, the system can measure the breadth of a query such as by the number of cards it returns. If the number of search results is over a threshold, the search query can be deemed to be too broad and the system can indicate that a user cannot associate a card with the query. In yet a further example, once a query has a certain number of cards associated with it, the system can deny the ability to create further cards for the query.

If a user is not authorized to create content in conjunction with the query, execution follows the "no" branch to operation 310 where the system can disable the control a user would use to create content. Disabling a control can be indicated to a user by greying out or otherwise changing the visible appearance of the control to signal to the user that the option is not available. If a user hovers over or otherwise interacts with the disabled control, the system can present information to the user that explains why the control has been disabled and the user is unable to create content for the query.

If the user is authorized to create content in conjunction with the query, execution follows the "yes" branch where the UI control used by the user to create content is enabled (operation 312). Execution then waits until the user activates the control to create content for the query (operation 314).

When the user activates the control, the system presents a user interface (operation 316) to the user that allows the user to enter, upload, link to or otherwise identify the content for the card. The user submits the content (operation 318 and arrow 334) for the card and execution proceeds to operation 320.

Users indicate which query the card should be associated with, such as by entering the query in operation 306. However, users may view the appropriate query differently than the search system which uses different logic to retrieve cards and other content for a given query. Simply put, some users are not very good at identifying which query should be associated with a card. In those instances, the system can use logic to expand the search query and/or identify alternative search queries that might be appropriate for the card. This can be done in several ways. In one example, the system can parse the card and identify key words and phrases that should be indexed for the card. In another example, the system can rely on past queries to identify queries relevant to a card. In this example, the system tracks received queries and which content ultimately interests the user. Based on these successful query-result pairs and/or statistics describing successful query-result pairs, the system can use the content of the card, extracted words and/or phrases from the card, of other similar features as hypothetical results and identify associated queries that would successfully lead a user to the card. Said another way, a search engine receives a query and returns a relevant set of results. The same and/or similar logic and approach can be used to solve the inverse problem here which is given a set of results (i.e., card features) identify a set of relevant queries.

These approaches which take a set of card features and return a set of relevant queries are depicted in operation 320 where the search query is expanded using one or more of the described approaches. Not all embodiments need perform operation 320 to expand the search queries beyond the received query. For those that do perform operation 320, the system can simply automatically associate a defined number of additional queries with the card. For example, a score for each of the queries can be calculated and the queries ordered by the score. The top N queries can then be selected and associated with the card.

To calculate the score, the query-result pairs and/or statistics discussed above can be used. For example, give a set of query-result pairs, the likelihood can be calculated that a given query leads to a given result being selected. Similarly, for a given result, the set of queries that are relevant to the result can be calculated from the query-result pairs. Thus, for card features that are the same as/similar to the result, the corresponding query likelihood can be used as a score for the card. Thus, the queries can be ordered by this likelihood and the top N queries selected to be associated with the card.

Additionally, or alternatively, queries can be expanded using various other strategies. The system can utilize word similarity to expand queries. Additional queries can use words similar to the original query. Thus, if a query uses "vacation" a similar query might use "holiday" or a query that uses "design" might be like a query that uses "design spec" or "design specification." Another strategy is to recognize the similarity of queries that use the same keywords/phrases in a different manner. Thus, a query that uses "photo lithography" is the same as a query that "what is photo lithography." Yet another strategy is to recognize the interchangeability of query patterns. Thus, a query having a pattern of "A B" is often the same as a query having a pattern of "B A". User behavior can also provide clues to query similarity. Thus, a user that starts out with query A and doesn't find anything useful and afterward switches to query B and does find something useful, is an indication that query A and query B are similar. Additionally, when users that submit query A click on the same or similar documents as those that submit query B, the system can infer that query A is similar to query B.

Additionally, or alternatively, the system can present the set of expanded queries (or a subset thereof) to the user and allow the user to select which additional queries should be associated with the card.

Once the card has been identified and the associated queries identified, the system creates a record for the user index as indicated by operation 322. The record in the user index may store the card or may store information that points to where the content of the card can be retrieved. Thus, the records can comprise one or more of:

Card content.
A link to where the card content can be located and retrieved.
A summary of the card content.
Card creation date.
Card expiration date.
User that created the card.
Other metadata such as feedback, rating, and so forth.

As indicated, when a card is created, the card can be assigned an expiration date. This expiration date can be displayed to a user when the card is created. Embodiments of the disclosure can implement various quality control strategies to keep the user content both relevant and timely. One piece of such a quality control strategy can be to assign expiration dates to cards. An expiration date can be assigned as a fixed time period (i.e., 6 months, etc.), as a variable time period (i.e., 3 months from last access), and/or a combination of either. Furthermore, the time periods can be based on other factors such as the user (i.e., some users can have longer time period than other users), the card, a user's work group, a user's title, a user's position in the enterprise, and/or any other such factors or combination of factors.

Figure 6:
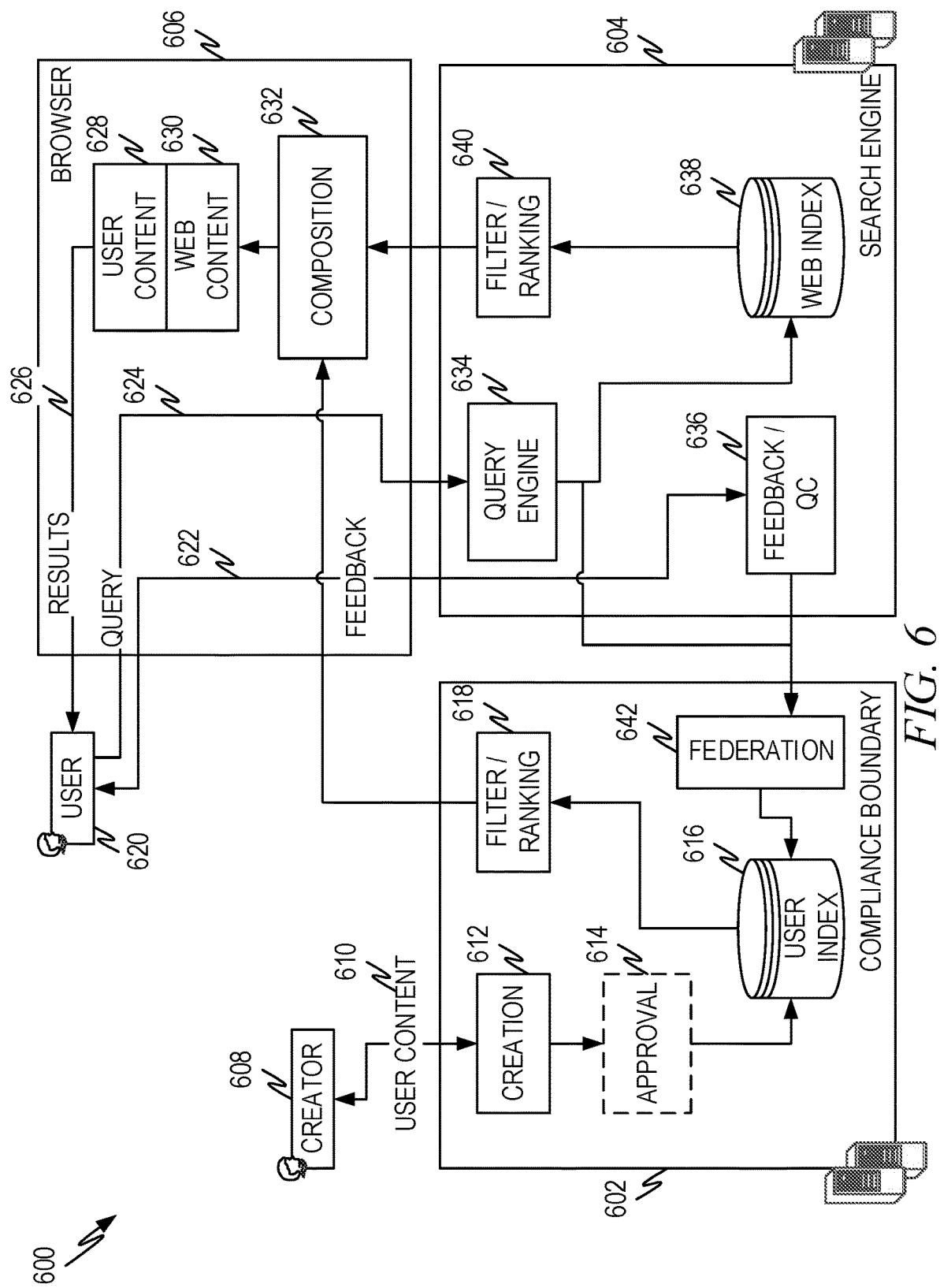
FIG. 6 illustrates an example architecture including an accompanying compliance boundary that allows users to create content for a query.

Once the record is created, the record is stored in the user index, such as user index 130 of FIG. 1 or 616 of FIG. 6. The system returns a URL 336 to the user. This URL can be sent to others and will always retrieve the card directly (i.e., without going through any search logic, etc.). The URL thus represents a way to bypass any filtering applied by the search engine when results are returned.

As previously discussed, content can go through an approval process before a card is made available to be retrieved by a search query. As discussed above, the URL created at the time the card was created can always be used to retrieve the information. The approval process is represented by operation 324. Also as previously discussed, in some embodiments approval is not needed. In still other embodiments, whether the approval process is performed may be based on factors such as who the user is, the content of the card, a user's work group, a user's title, a user's position in the enterprise, and/or any other such factors or combination of factors.

The approval process 324 can feed information to an administrator to allow the administrator to give approval. Additionally, or alternatively, the approval process 324 may rely on automated processes, machine learning processes, keyword/key phrase matching, and other such processes to automatically approve some or all the submitted cards. For example, the approval process 324 can filter out (i.e., deny approval) cards that fit certain criteria (i.e., violate enterprise policy, or other criteria). In another example, the approval process 324 filters out cards that it can determine should be denied approval, approves those that it can determine should be approved, and passes on to an administrator those that it cannot determine whether to approve or deny. In yet another example, all cards are passed to an administrator for approval.

In systems where approval is given before a card is made available to be retrieved by a search query, when a search query would retrieve a card with approval still pending, the search results can be returned without the card. In other embodiments, the card can be returned with an "approval pending" label. In still other embodiments, the card is not returned, but information related to the card is placed in the search results so that the user running the query can determine that a card that has not received approval exists, but won't be shown until approval is given. Such information can include, for example, the content creator and the user attempting to retrieve the data can contact the content creator to obtain the URL that will allow the card to be retrieved directly.

The content creation process ends at operation 328.

As an alternative to the sequence of operations listed above (i.e., a user submits a query then creates the card, etc.), the user may invoke the content creation process without first submitting a query. The user can create the card and the system can have a default query and/or query derived from the content as discussed above. The user can then edit the query and/or the system can expand the query as discussed.

Figure 4:
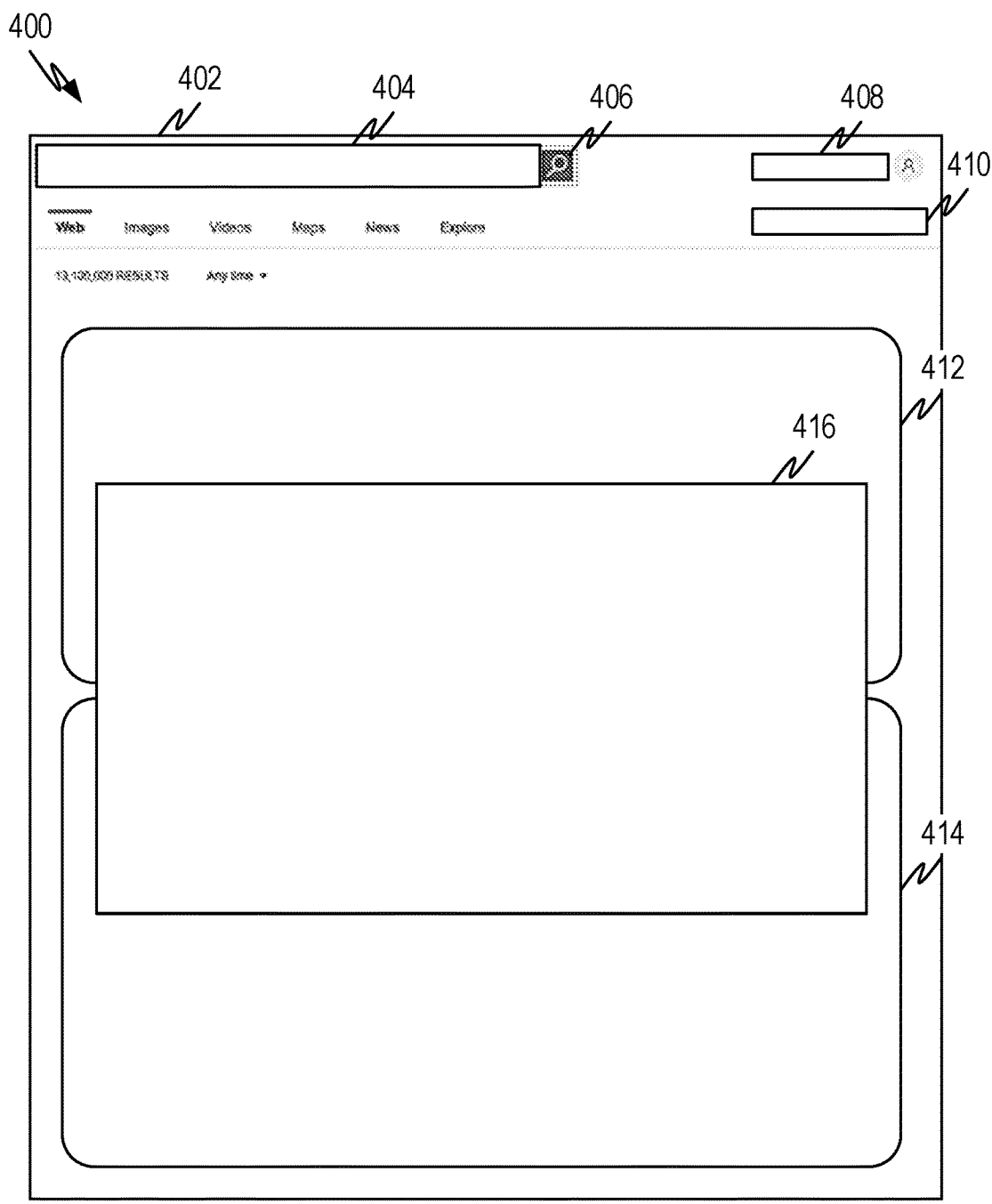
FIG. 4 illustrates an example user interface for creating content for a user query.

FIG. 4 illustrates an example user interface 400 for creating content for a user query. This UI represents, for example, a UI that would work in conjunction with the flow diagram of FIG. 3 to allow a user to create content for a query. The UI comprises a window 402 that holds the UI areas, controls and so forth. The UI also comprises an area 408 where a user can click or otherwise manipulate a control to authenticate to the search engine. The control will allow a user to authenticate using one or more authentication mechanisms such as username/password, multi-factor authentication, authentication by biometrics and so forth. As noted above, the authentication allows the search engine to identify which user index the user is authorized to access, if any. Furthermore, the user credentials can be utilized to federate to a user index that is behind a compliance boundary as discussed below.

The user interface also has an area 404 to enter a search query to retrieve web and/or user search results as described herein. The user types or otherwise enters a search query into an area 404 and manipulates a control such as 406, presses the enter key or performs a gesture to submit the search query to the search engine.

The user interface also has two areas 412, 414 for presentation of private (user) search results and public (web) search results, respectively. In this user interface, the user results are presented first while the web results are presented afterward. The areas 412, 414 can be sized such that they scroll separately (i.e., the user can scroll the search results in area 412 separately from the search results in area 414).

The user interface also provides an area 410 that contains a control that a user can manipulate to create user content. The control would, for example be enabled or disabled based on whether a user is authorized to create content for the query as discussed above in conjunction with FIG. 3. Furthermore, when the control is disabled, a hover or other gesture can trigger the system to display why the user is not authorized to create content. For example, the user may not have authenticated to the system, may have reached a limit for the number of cards the user can create, and so forth as previously described.

If the user is authorized to create content for the query, manipulation of the control such as through a click, touch or other gesture can bring up an area such as 416 where a user can enter content and/or identify where content for the card is located. For example, area 416 can comprise a rich content editor that allows a user to create rich media content such as formatted text, hyperlinks, graphics, audio, video and so forth. These items can be created, liked to, downloaded, embedded and/or otherwise combined to create the content for the card. Additionally, or alternatively, the area 416 can present controls that allow the user to link previously created content to the card. For example, a document, presentation, video or other content that has been previously created, such as through another program.

Once the user is satisfied with the content, the user can submit the content to the system, such as through a submit and/or enter control in area 416, in a menu, and so forth.

As described above, a user can submit feedback for a card. The feedback process is part of the quality control aspect of many embodiments disclosed herein. In some embodiments, the feedback is used in conjunction with expiration dates as described above to not only keep the cards relevant but also current. Feedback can also encourage users who submit cards of low quality to either delete the card and/or improve the quality of the card. Thus, feedback can become a deterrent for users to create inappropriate or irrelevant data and place it in the search results of those with an organization, work group, and so forth.

Figure 5:
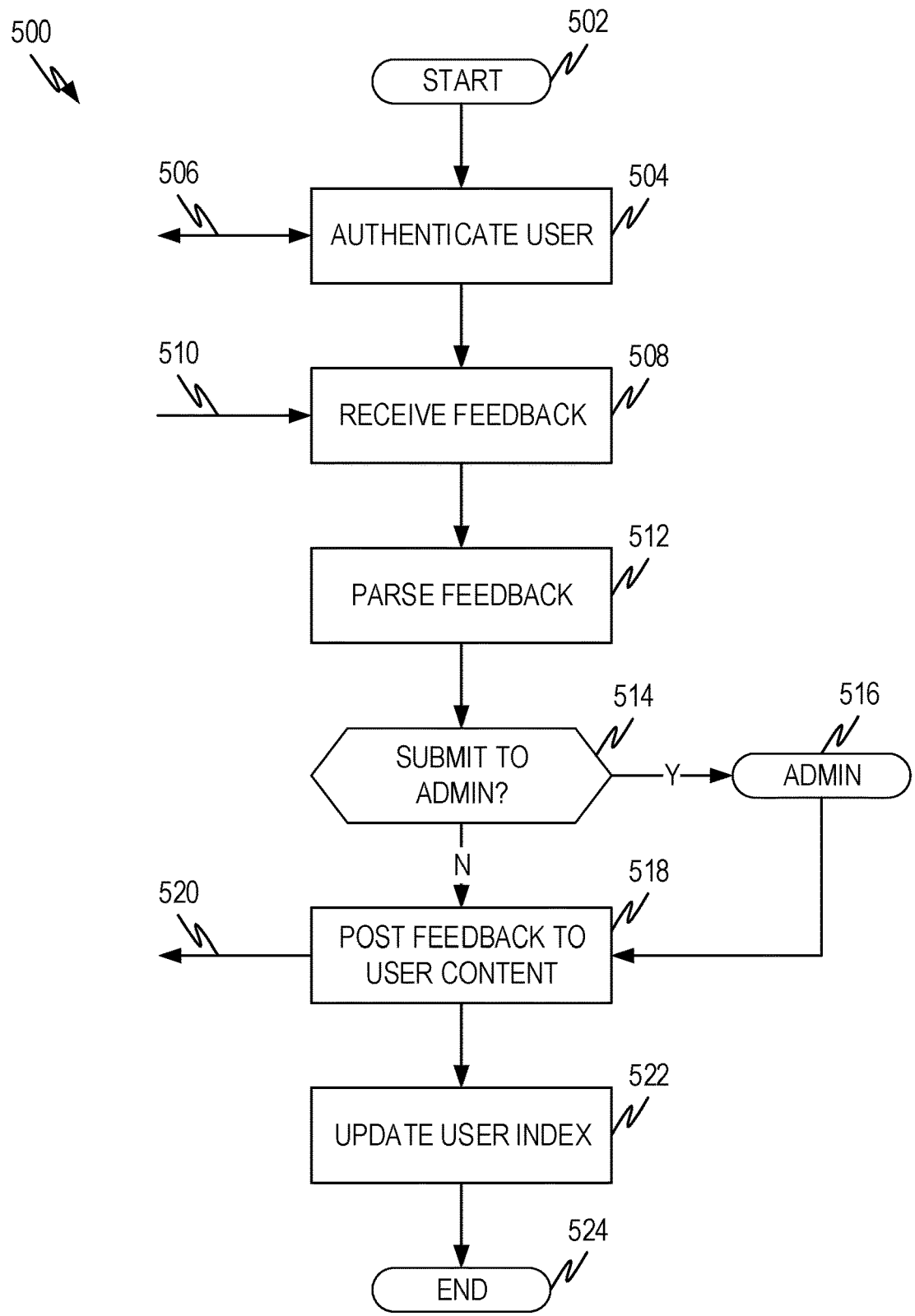
FIG. 5 illustrates an example flow diagram for receiving feedback for user created content.

FIG. 5 illustrates an example flow diagram 500 for receiving feedback for user created content. The process begins at operation 502 and proceeds to operation 504 where the search engine receives the user credentials as indicated by arrow 506 if the user has not already been authenticated to the system. As previously discussed, any type of authentication can be used such as username/password, multi-factor authentication, biometric authentication and so forth. The user is authenticated for the system to identify whether a user is authorized to submit feedback for a card. As described in conjunction with FIG. 3, the system can enable and/or disable user interface controls depending on whether a user is authorized to submit feedback or not authorized to submit feedback. The enterprise can establish any desired policy that specifies the conditions under which a user is authorized to submit feedback. In some embodiments, polices can also describe the scope of the feedback that can be submitted as described below.

Operation 508 receives feedback from the user as indicated by arrow 510. In the context of this disclosure, feedback is a broad term that encompasses such things as ratings (thumbs up, likes, thumbs down, dislikes, ratings on a scale such as 1-5, and other such ratings) as well as commentary on the card such as where a user describes in text, voice, or in some other fashion their opinions about the card. For example, a card may have a control that allows a user to give a rating and/or describe their feedback. In some embodiments conditions to provide feedback may be imposed such as only allowing feedback after a card has been approved, allowing only certain kinds of feedback or feedback that fits a form, etc. In many embodiments, the ability to provide feedback is not restricted and users can provide feedback on any cards the user can retrieve.

Similarly, the system can track user interactions with the user content, such as whether the user reads the card, whether the user clicks on a search link to retrieve the card, how long the user spends with the card, whether the user forwards or recommends the card to others and so forth. For example, if a user forward the card to several other people, the system can infer that the user found the content relevant and increase the relevance of the user content (i.e., as it relates to the user's query that retrieved the card). Alternatively, if no user has ever clicked on a link to retrieve the card, the system can infer that the card is irrelevant (i.e., as it relates to the user's query), that the card is low quality, or other such inferences. Such inferences are made by a machine learning model. Thus, feedback can be explicit (such as a comment and/or rating) or can be implicit (such as through tracking user interactions/actions).

The feedback can be parsed in operation 512, such as when the feedback comes in the form of a block of text, voice, etc. Operation 512 can scan the feedback provided and extract features on which decisions can be made. In some embodiments operation 512 is optional and/or not implemented.

Operation 514 represents a decision as to whether the feedback should be sent to an administrator for resolution. Decisions can be based, for example, on rules or policies that indicate conditions under which feedback should be sent to an administrator. For example, if someone gives feedback that a card is against an enterprise policy, could open the enterprise up to liability or other categories of feedback that the enterprise determines should be handled on an administrator level, the feedback may be sent to an administrator for evaluation and handling. This can be accomplished, for example, by scanning (i.e., in the parsing operation) the feedback content for keywords and/or key phrases that are associated with such situations. As another example, machine learning algorithms can also be used to analyze feedback to identify whether it meets one or more criterion to be forwarded to an administrator 516 for handling.

In operation 518, collected feedback can be stored and displayed in conjunction with the card when it is displayed as part of the search results or when the card is retrieved via the URL for the card. For example, when a user pulls up a card as part of search results, the user may see such information as ratings, comments, and so forth. When a user retrieves the card, the user may see the same thing that other users see. Additionally or alternatively, if the user is the content's creator, the user may see information not available to others such as statistics on how often the card has been returned as part of search results, how many users have clicked to retrieve the card, who has retrieved the card, and so forth. This is illustrated by arrow 520.

In operation 522 any remaining updates to the user index to account for the feedback are made. This may include storing the feedback in the index, updating the record to point to the feedback, updating ratings, statistics, and so forth. The process then ends at operation 524.

Because a search engine that returns user created content as well as web content deals with potentially sensitive and private data from the enterprise, steps can be taken to ensure that no one (i.e., at the company that provides the search engine service) accesses the private, sensitive data. This can be accomplished by ensuring the entire search engine is compliant. For example, the architecture of FIG. 1 illustrates an implementation where the entire search engine is compliant. In this context, compliant means that unauthorized individuals, such as engineers and others that work on the search engine do not have access to sensitive or private data. Compliance has far reaching design and implementation choices and it can be difficult to ensure that an entire search engine is compliant. As an alternative to ensuring that the entire search engine is compliant, a compliance boundary can be established and the sensitive, private data hosted behind the compliance boundary.

FIG. 6 illustrates an example architecture 600 including an accompanying compliance boundary that allows users to create content for a query. The architecture comprises a search engine backend 604, a compliance boundary 602, both of which communicate with the browser 606.

User content is created as described above, except that the use content creation is housed behind the compliance boundary in some embodiments. Thus, a content creator 608 create a card 610 through a content creation process 612 as previously described, in conjunction with FIG. 1 and FIGS. 3-4. The approval process 614 also works as previously described.

The user index 616 also resides behind the compliance boundary and operates as described below. The user index 616 can contain the same information as described above.

The embodiment of FIG. 6 illustrates the feedback process 636 as residing outside the compliance boundary. Such might be appropriate, for example, where feedback consists of ratings and not commentary on a card. However, embodiments can also place the feedback process 636 behind the compliance boundary if the feedback also contains information that the enterprise would not want exposed to unauthorized individuals. The feedback process 636 can operate the same way independent of whether or not it is located behind the compliance boundary. The feedback process 636 can operate as described in the embodiments above.

The largest change from prior described embodiments comes in how the system handles how search queries are received, processed and search results returned and presented to a user. The following represents a summary of how the process works with further illustration in conjunction with FIG. 7 below.

A user 620 submits a query 624, such as through the interface described in one of the user interface diagrams above. The search query is received by the search engine 604 such as by a query engine 634. Public results are retrieved by the search engine 604 outside of the compliance boundary. The search query is used to search the web index 638 (i.e., by the query engine) to identify and the results are ranked by the ranking process 640. The ranking process 640 can operate as previously described and in addition can select a proper subset of the results to return to the user. Once the results are selected, the results are returned to the browser 606, such as to a composition process 632.

Private results are retrieved by passing the search query to the user index 616 behind the compliance boundary 602. For example, as the user authenticates to the search engine 604, the search engine 604 obtains a security token based on the user's authentication credentials. The search engine 604 also obtains a tenant ID that identifies enterprise (and hence the user index that should be searched) based on the security token. The tenant ID, the security token and the search query 624 are presented to a federation process 642 that knows how to search the user index 616 so that private search results can be retrieved. Because the search engine 604 only has access to a tenant ID, the search engine cannot identify any information about the enterprise associated with the tenant ID. Furthermore, any unauthorized individuals who somehow gained access to the tenant ID would not be able to ascertain any information from the tenant ID that would expose any private information.

The federation process 642 searches the user index 616 using the search query 624 and retrieves the private results. The private results are passed to a filtering/ranking process 618 that applies the filtering and ranking logic that would otherwise (i.e., in the architecture of FIG. 1) be applied by the search engine 604. The filtering/ranking process 618 returns a proper subset of the search results directly to the browser 606, such as to the composition process 632. Thus, there is no private information that is sent through the search engine. This minimizes the opportunity for private information to be accessed by unauthorized individuals.

The composition process 632 takes the public and private search results and places them in a form, HTML document, or other compatible document so they can be presented to the user. Thus, the output of the composition process 632 is a user interface, such as that illustrated in FIG. 2, that comprises the user content 628 and the web content 630 to the user 620.

Figure 7:
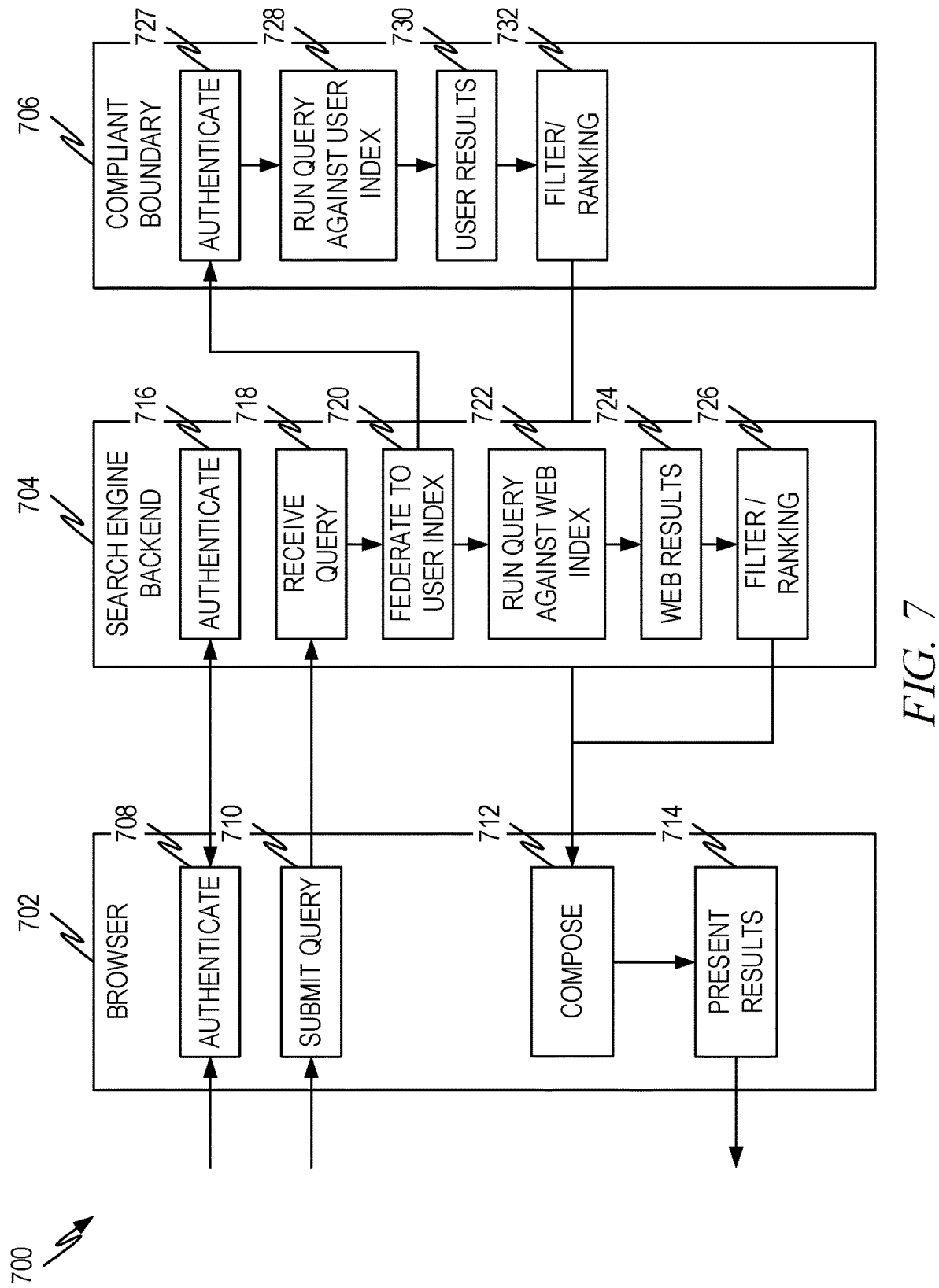
FIG. 7 illustrates an example diagram showing interactions among various component parts of an example architecture with a compliance boundary.

FIG. 7 illustrates an example diagram 700 showing interactions among various component parts of an example architecture with a compliance boundary. The diagram 700 illustrates the data interactions between the browser 702, the search engine 704 and the systems behind the compliance boundary 706.

A user first initiates authentication to the search engine 704 through the browser 702 as indicated by operations 708 and 716. The authentication can be initiated through a user interface control as previously described. Operations 708 and 716 represent the data exchanges that are part of the authentication process. Also as noted the authentication process can be username\password, multi-factor authentication, biometric authentication or another authentication process.

The user submits a search query 710 as previously described and the search query is received by the search engine 704 in operation 718. The search engine 704 then federates to the user index using the security toke and tenant ID as previously described and as illustrated in operation 720. The federation process authenticates the search engine 704 as indicated by authentication operation 727. This ensures that the user is authorized to access the user index behind the compliance boundary 706.

If the user passes authentication, the query is run against the user index as indicated by operation 728. This can be accomplished using known methods to search a database using a query. The results from the query are obtained 730 and presented to a filtering/ranking process 732. The filtering/ranking process 732 operates as described above (i.e., filtering/ranking process 618 and/or filtering/ranking process 136) and produces a proper subset of the search results to be returned to the user. The proper subset comprises the most relevant search results. The proper subset of private results is returned directly (i.e., without passing through the search engine 704) to the browser 702 to the composition process 712.

The public results are obtained by the search engine 704 running the search query against the web index as indicated in operation 722. This is performed as previously described using known methods. The web results 724 are presented to a filtering/ranking process 726. The filtering/ranking process 726 selects a proper subset of the web results and sends the proper set to the composition process 712. Filtering and ranking performed by filtering/ranking process 726 can be performed as previously described.

The composition process 712 receives both the proper subset of the web results and the proper subset of the user results and presents them to the user (operation 714) as previously described.

Example Machine Architecture and Machine-Readable Medium

Figure 8:
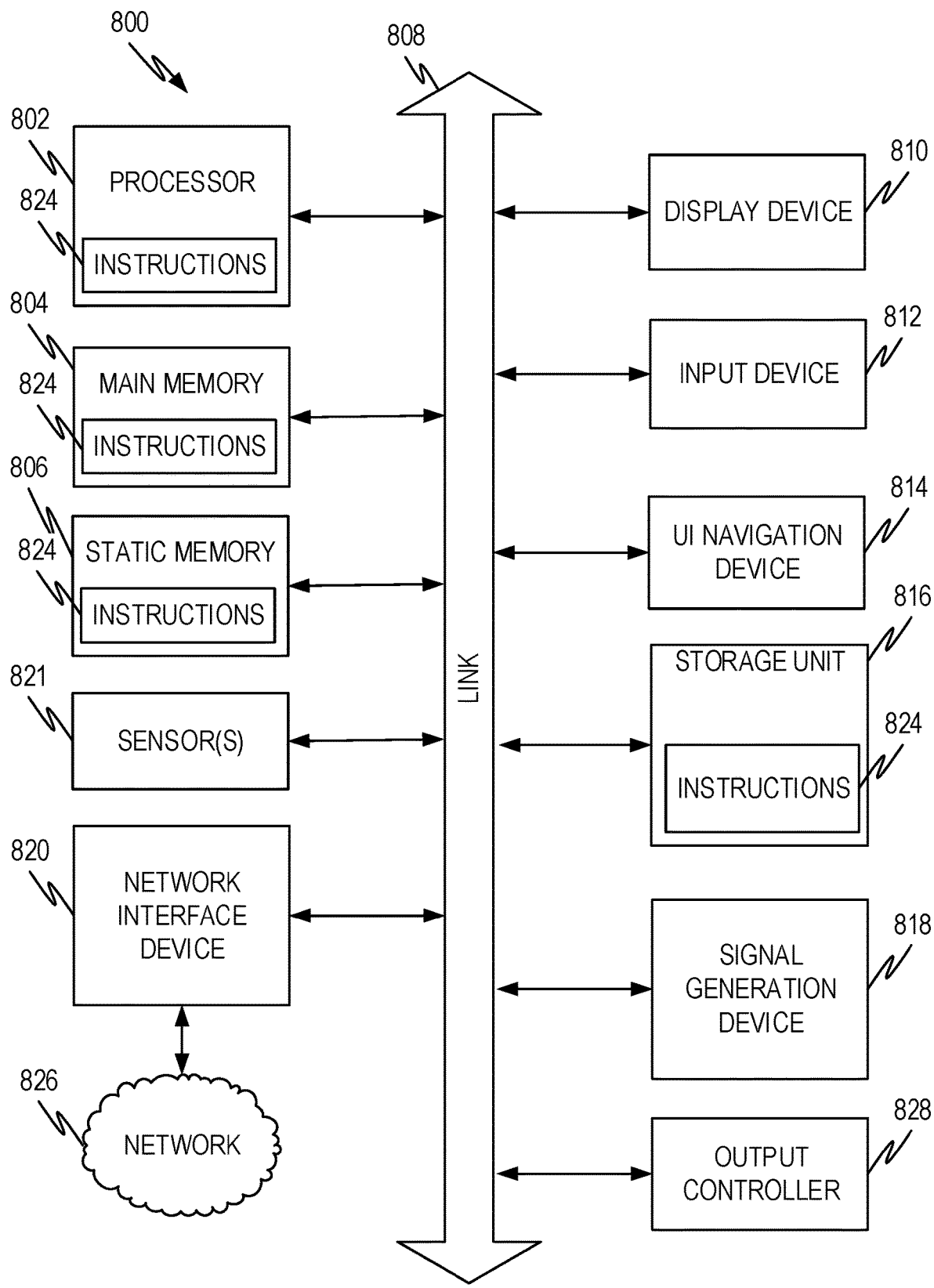
FIG. 8 illustrates a representative machine architecture suitable for implementing the systems and so forth or for executing the methods disclosed herein.

FIG. 8 illustrates a representative machine architecture suitable for implementing the systems and so forth or for executing the methods disclosed herein. The machine of FIG. 8 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 8 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 800 includes at least one processor 802 (e.g., a central processing unit (CPU), a graphics processing unit (GPU), advanced processing unit (APU), or combinations thereof), one or more memories such as a main memory 804, a static memory 806, or other types of memory, which communicate with each other via link 808. Link 808 may be a bus or other type of connection channel. The machine 800 may include further optional aspects such as a graphics display unit 810 comprising any type of display. The machine 800 may also include other optional aspects such as an alphanumeric input device 812 (e.g., a keyboard, touch screen, and so forth), a user interface (UI) navigation device 814 (e.g., a mouse, trackball, touch device, and so forth), a storage unit 816 (e.g., disk drive or other storage device(s)), a signal generation device 818 (e.g., a speaker), sensor(s) 821 (e.g., global positioning sensor, accelerometer(s), microphone(s), camera(s), and so forth), output controller 828 (e.g., wired or wireless connection to connect and/or communicate with one or more other devices such as a universal serial bus (USB), near field communication (NFC), infrared (IR), serial/parallel bus, etc.), and a network interface device 820 (e.g., wired and/or wireless) to connect to and/or communicate over one or more networks 826.

Executable Instructions and Machine-Readable Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method comprising:
receiving a search query from a user (306);
responsive to receiving the search query, checking to see whether the user is authorized to submit user generated content for the query (308);
responsive to determining that the user is authorized to submit user generated content for the query:
presenting a user interface to the user (316);
receiving from the user via the user interface, an indicator of user generated content to be associated with the query (318);
creating a record associated with the user generated content, the record comprising information to retrieve the user generated content (322);
storing the record in a user index database (322);
returning a URL to the user, the URL bypassing any filters to directly retrieve the user generated content (336).

Example 2

The method of example 1, further comprising:
tracking user queries and user document interaction over a period of time prior to receipt of the search query;
deriving a plurality of additional search queries similar to the search query from the user queries and user document interaction; and
associating at least a portion of the plurality of additional search queries with the user generated content.

Example 3

The method of example 2, further comprising:
submitting the user generated content for approval; and
allowing access to the user generated content while approval is pending when the content is accessed by the URL.

Example 4

The method of example 1, 2 or 3, further comprising:
evaluating the search query and the user generated content and creating alternative queries to the search query.

Example 5

The method of example 1, 2 or 3, further comprising:
receiving a federation request to federate to the user index database, the request comprising a second received query;
authenticating the federation request;
responsive to determining that the federation request is authorized:
running the second received query for the user index database; and
returning a subset of results from the second received query directly to a browser without returning any results to a source of the federation request.

Example 6

The method of example 1, 2 or 3, further comprising:
responsive to determining that the user is not authorized to submit user generated content for the query, disabling a user interface element associated with creating user generated content.

Example 7

The method of example 1, 2 or 3, further comprising setting an expiration date for the user generated content after which the user generated content will no longer be accessible via search query.

Example 8

The method of example 1, 2 or 3, further comprising:
receiving feedback from a second user on the user generated content;
associating the feedback with the user generated content;
in response to receiving a query that retrieves the user generated content, presenting the feedback along with the user generated content in response, or updating ranking of the user generated content, or both.

Example 9

A computing system comprising:
a processor and executable instructions accessible on a machine-readable medium that, when executed, cause the system to perform operations comprising:
receiving an authentication request from a user (716);
receiving a search query from the user (108, 624, 718);
running the search query for a web index database comprising public information (128, 132, 634, 638, 722);
responsive to authenticating the user:
accessing a user index database based on credentials provided as part of the authentication request from the user (128, 130, 642, 727); and
running the search query for the user index database (128, 130, 634, 616, 728); and
returning a subset of search results from the web index database (132, 136, 638, 640, 726), a subset of the search results from the user index (130, 136, 616, 618, 732), or both a subset of the results from the web index and a subset of the search results from the user index, the subset of search results from the web index comprising public web information, the subset of search results from the user index comprising private information.

Example 10

The system of example 9, further comprising:
receiving a second search query from the user;
responsive to receiving the second search query, checking to see whether the user is authorized to submit user generated content for the second search query;
responsive to determining that the user is authorized to submit user generated content for the second search query:
presenting a user interface to the user;
receiving from the user via the user interface, an indicator of user generated content to be associated with the second search query;
creating a record associated with the user generated content, the record comprising information to retrieve the user generated content;
storing the record in the user index database;
returning a URL to the user, the URL bypassing any filters to directly retrieve the user generated content.

Example 11

The system of example 9, further comprising:
evaluating search results of the user index;
selecting the subset of the results from the web index based on the evaluation.

Example 12

The system of example 10, further comprising:
Submitting the user generated content for approval; and
allowing access to the user generated content while approval is pending when the content is accessed by the URL.

Example 13

The system of example 10, further comprising:
responsive to determining that the user is not authorized to submit user generated content for the second search query, disabling a user interface element associated with creating user generated content.

Example 14

The system of example 9, 10, 11, 12, or 13, wherein accessing the user index database based on credentials provided as part of the authentication request from the user comprises:
retrieving a tenant ID associated with the user;
federating to the user index database using the credentials; and
wherein the subset of search results from the user index database are returned directly to a browser.

Example 15

The system of example 10, further comprising:
receiving feedback from a second user on the user generated content;
associating the feedback with the user generated content;
in response to receiving a query that retrieves the user generated content, presenting the feedback along with the user generated content in response.

Example 16

The system of example 10, further comprising setting an expiration date for the user generated content after which the user generated content will no longer be accessible via search query.

Example 17

A machine-readable medium having executable instructions encoded thereon, which, when executed by at least one processor of a machine, cause the machine to perform operations comprising:
receiving an authentication request from a user (716);
receiving a search query from the user (108, 624, 718);

running the search query for a web index database comprising public information (128, 132, 634, 638, 722);
returning a subset of search results from the web index database, the subset of search results comprising public web information (132, 136, 638, 640, 726);
responsive to authenticating the user:
accessing a user index database based on credentials provided as part of the authentication request from the user (128, 130, 642, 727); and
running the search query for the user index database (128, 130, 634, 616, 728).

Example 18

The machine-readable medium of example 17, further comprising:
receiving feedback from a second user on the user generated content;
passing the feedback to the user index database.

Example 19

The machine-readable medium of example 17, wherein accessing a user index database based on credentials provided as part of the authentication request from the user comprises federating to the user index database based on the credentials.

Example 20

The machine-readable medium of example 19, wherein running the search query for the user index database comprises passing the search query to the user index database.

Example 21

A method comprising:
receiving an authentication request from a user (716);
receiving a search query from the user (108, 624, 718);
running the search query for a web index database comprising public information (128, 132, 634, 638, 722);
responsive to authenticating the user:
accessing a user index database based on credentials provided as part of the authentication request from the user (128, 130, 642, 727); and
running the search query for the user index database (128, 130, 634, 616, 728); and
returning a subset of search results from the web index database (132, 136, 638, 640, 726), a subset of the search results from the user index (130, 136, 616, 618, 732), or both a subset of the results from the web index and a subset of the search results from the user index, the subset of search results from the web index comprising public web information, the subset of search results from the user index comprising private information.

Example 22

The method of example 21, further comprising:
receiving a second search query from the user;
responsive to receiving the second search query, checking to see whether the user is authorized to submit user generated content for the second search query;
responsive to determining that the user is authorized to submit user generated content for the second search query:
presenting a user interface to the user;
receiving from the user via the user interface, an indicator of user generated content to be associated with the second search query;
creating a record associated with the user generated content, the record comprising information to retrieve the user generated content;
storing the record in the user index database;
returning a URL to the user, the URL bypassing any filters to directly retrieve the user generated content.

Example 23

The method of example 21 or 22, further comprising:
evaluating search results of the user index;
selecting the subset of the results from the web index based on the evaluation.

Example 24

The method of example 21 or 22, further comprising:
evaluating search results of the web index;
selecting the subset of the results from the user index based on the evaluation.

Example 25

The method of example 22, 23, or 42, further comprising:
submitting the user generated content for approval; and
allowing access to the user generated content while approval is pending when the content is accessed by the URL.

Example 26

The method of example 22, 23, 24, or 25, further comprising:
responsive to determining that the user is not authorized to submit user generated content for the second search query, disabling a user interface element associated with creating user generated content.

Example 27

The method of example 21, 22, 23, 24, 25, or 26, wherein accessing the user index database based on credentials provided as part of the authentication request from the user comprises:
retrieving a tenant ID associated with the user;
federating to the user index database using the credentials; and
wherein the subset of search results from the user index database are returned directly to a browser.

Example 28

The method of example 22, 23, 24, 25, 26, or 27, further comprising:
receiving feedback from a second user on the user generated content;
associating the feedback with the user generated content;
in response to receiving a query that retrieves the user generated content, presenting the feedback along with the user generated content in response.

Example 29

The method of example 21, 22, 23, 24, 25, 26, 27, or 28, further comprising:

receiving feedback from a second user on the user generated content;
associating the feedback with the user generated content;
in response to receiving a query that retrieves the user generated content, updating ranking of the user generated content.

Example 30

The method of example 22, 23, 24, 25, 26, 27, 28, or 29, further comprising setting an expiration date for the user generated content after which the user generated content will no longer be accessible via search query.

Example 31

The method of example 21, 22, 23, 24, 25, 26, 27, 28, 29, or 30, further comprising setting an expiration date for the user generated content after which the user generated content will no longer be accessible via search query.

Example 32

The method of example 22, 23, 24, 25, 26, 27, 28, 29, 30, or 31, further comprising:
evaluating the search query and the user generated content and creating alternative queries to the search query.

Example 33

The method of example 22, 23, 24, 25, 26, 27, 28, 29, 30, 31, or 32, further comprising:
tracking user queries and user document interaction over a period of time prior to receipt of the search query;
deriving a plurality of additional search queries similar to the search query from the user queries and user document interaction; and
associating at least a portion of the plurality of additional search queries with the user generated content.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method comprising:
receiving a search query from a user;
responsive to receiving the search query, checking to see whether the user is authorized to submit a card associated with the search query, the card comprising content created by the user;
responsive to determining that the user is authorized to submit the card associated with the search query, ensuring a user interface control which allows the user to submit the card associated with the search query is enabled;
responsive to determining that the user is not authorized to submit the card associated with the search query, ensuring the user interface control is disabled;
responsive to the user activating the user interface control:
presenting a user interface to the user;
receiving from the user via the user interface, the card associated with the search query, the card comprising content created by the user;
associating the card with the search query;
creating a record associated with the card, the record comprising information to retrieve the card;
storing the record in a user index database accessible to a search engine such that the search engine can retrieve cards in response to the search query;
returning a URL to the user, the URL bypassing any filters to directly retrieve the card.

2. The method of claim 1, further comprising:
tracking user queries and user document interaction over a period of time prior to receipt of the search query;
deriving a plurality of additional search queries similar to the search query from the user queries and user document interaction; and
associating at least a portion of the plurality of additional search queries with the card.

3. The method of claim 2, further comprising:
submitting the card for approval; and
allowing access to the card while approval is pending only when the content is accessed by the URL.

4. The method of claim 1, further comprising:
evaluating the search query and the card and creating alternative queries to the search query.

5. The method of claim 1, further comprising:
receiving a federation request to federate to the user index database from a search engine, the request comprising a second query received by the search engine;
authenticating the federation request;
responsive to determining that the federation request is authorized:
running the second query for the user index database; and
returning a subset of results from the second query directly to a browser without returning any results to the search engine.

6. The method of claim 5, wherein authenticating the federation request further comprises:
receiving a tenant ID associated with an enterprise where the user index database resides;
receiving a security token associated with a user submitting the second query;
determining whether the user submitting the second query is authorized to access the user index database based on the tenant ID and security token.

7. The method of claim 1, further comprising setting an expiration date for the card after which the card will no longer be accessible via search query.

8. The method of claim 1, further comprising:
receiving feedback from a second user on the card;
associating the feedback with the card;

in response to receiving a query that retrieves the card, presenting the feedback along with the card in a response, or updating ranking of the card, or both.

9. A computing system comprising:
a processor and executable instructions accessible on a machine-readable medium that, when executed, cause the system to perform operations comprising:
receiving authentication credentials from a user;
receiving a search query from the user;
responsive to receiving the search query, checking to see whether the user is authorized to submit a card associated with the search query, the card comprising content created by the user, based on the authentication credentials;
responsive to determining that the user is authorized to submit the card associated with the search query, ensuring a user interface control which allows the user to submit the card associated with the search query is enabled;
responsive to determining that the user is not authorized to submit the card associated with the search query, ensuring the user interface control is disabled;
responsive to the user activating the user interface control:
presenting a user interface to the user through which the card associated with the search query, the card comprising content created by the user, can be received;
receiving from the user the card associated with the search query via the user interface, the card comprising content not retrieved by the search query;
creating a record associated with the card associated with the search query, the record comprising information to retrieve the card associated with the search query;
storing the record in a user index database;
returning a URL to the user, the URL bypassing any filters to directly retrieve the card.

10. The system of claim 9, further comprising:
receiving from a search engine a second search query entered by the user and submitted to the search engine;
determining whether the user is authorized to access the user index database; and
returning search results from the user index database based on the second query directly to a user device without passing the search results to the search engine.

11. The system of claim 10, further comprising:
receiving a security token from the search engine; and
wherein determining whether the user is authorized to access the user index database is based on the security token.

12. The system of claim 10, wherein determining whether the user is authorized to access the user index database comprises:
receiving a tenant ID associated with an enterprise where the user index database resides;
receiving a security token associated with the user;
determining whether the user is authorized to access the user index database based on the tenant ID and security token.

13. The system of claim 9, further comprising:
submitting the card for approval; and
allowing access to the card while approval is pending only when the card is accessed by the URL.

14. The system of claim 9, further comprising:
receiving feedback from a second user on the card;
associating the feedback with the card;
in response to receiving a query that retrieves the card, presenting the feedback along with the card in response.

15. The system of claim 9, further comprising setting an expiration date for the card after which the card will no longer be accessible via search query.

16. A machine-readable medium having executable instructions encoded thereon, which, when executed by at least one processor of a machine, cause the machine to perform operations comprising:
receiving a search query and authentication credentials from a user;
checking to see whether the user is authorized to submit a card associated with the search query, the card comprising content created by the user, based on the authentication credentials;
responsive to determining that the user is authorized to submit the card associated with the search query, ensuring a user interface control which allows the user to submit the card associated with the search query is enabled;
responsive to determining that the user is not authorized to submit the card associated with the search query, ensuring that the user interface control is disabled;
responsive to the user selecting the user interface control:
receiving from the user the card associated with the search query, the card comprising content created by the user and not retrieved by the search query;
creating a record associated with the card associated with the search query, the record comprising information to retrieve the card associated with the search query;
storing the record in a user index; and
returning a URL to the user, the URL bypassing any filters to directly retrieve the card.

17. The machine-readable medium of claim 16, further comprising:
receiving feedback from a second user on the card;
storing the feedback in the user index.

18. The machine-readable medium of claim 16, further comprising running the search query against the user index.

19. The machine-readable medium of claim 16, further comprising:
receiving from a search engine a second search query entered by a second user and submitted to the search engine;
determining whether the second user is authorized to access the user index; and
returning search results from the user index based on the second query directly to a user device without passing the search results to the search engine.

* * * * *